United States Patent
Chidambaran et al.

(10) Patent No.: US 8,365,193 B2
(45) Date of Patent: Jan. 29, 2013

(54) RECOVERABLE ASYNCHRONOUS MESSAGE DRIVEN PROCESSING IN A MULTI-NODE SYSTEM

(75) Inventors: Lakshminarayanan Chidambaran, Sunnyvale, CA (US); Debashish Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2291 days.

(21) Appl. No.: 10/918,054

(22) Filed: Aug. 12, 2004

(65) Prior Publication Data
US 2005/0038835 A1 Feb. 17, 2005

Related U.S. Application Data

(60) Provisional application No. 60/495,368, filed on Aug. 14, 2003, provisional application No. 60/500,096, filed on Sep. 3, 2003, provisional application No. 60/500,050, filed on Sep. 3, 2003.

(51) Int. Cl.
*G06F 3/00* (2006.01)
(52) U.S. Cl. .................................... 719/314; 707/799
(58) Field of Classification Search .................. 707/203, 707/799; 719/314
See application file for complete search history.

(56) References Cited

U.S. PATENT DOCUMENTS

| | | | |
|---|---|---|---|
| 4,318,182 A | 3/1982 | Bachman et al. | |
| 5,113,522 A | 5/1992 | Dinwiddie et al. | |
| 5,151,987 A * | 9/1992 | Abraham et al. | 714/20 |
| 5,222,217 A | 6/1993 | Blount et al. | |
| 5,283,856 A | 2/1994 | Gross et al. | |
| 5,347,632 A | 9/1994 | Filepp et al. | |
| 5,357,612 A | 10/1994 | Alaiwan | |
| 5,465,328 A | 11/1995 | Dievendorff et al. | |
| 5,627,764 A | 5/1997 | Schutzman et al. | |
| 5,649,102 A | 7/1997 | Yamauchi et al. | |
| 5,721,825 A | 2/1998 | Lawson et al. | |
| 5,754,841 A | 5/1998 | Carino, Jr. | |
| 5,774,668 A | 6/1998 | Choquier et al. | |
| 5,790,807 A | 8/1998 | Fishler et al. | |
| 5,802,253 A | 9/1998 | Gross et al. | |
| 5,828,835 A | 10/1998 | Isfeld et al. | |
| 5,852,818 A | 12/1998 | Guay et al. | |

(Continued)

FOREIGN PATENT DOCUMENTS

EP 0 750 256 A2 6/1996
EP 0942363 A 9/1999

(Continued)

OTHER PUBLICATIONS

Current Claims in PCT application, International Application No. PCT/US03/23747, 14 pages.

(Continued)

*Primary Examiner* — Cheyne Ly
(74) *Attorney, Agent, or Firm* — Hickman Palermo Truong Becker Bingham Wong LLP

(57) ABSTRACT

An approach provides for recovery of message driven directors responsible for dynamically allocating resources within a multi-node database system. The receipt of a message, the action taken in response to it, and other messages sent in furtherance of the action, are performed within a single transaction. In this way, the messages and other data are left in a state consistent with the message and action taken in response being fully processed or not processed at all. A standby director, stepping in for a crashed director, inherits a state consistent with where a crashed director last successfully completed an action. The approach insulates directors from the special perils of performing high latency actions by delegating the performance of such actions to a job, (i.e. another process).

26 Claims, 4 Drawing Sheets

U.S. PATENT DOCUMENTS

| | | | |
|---|---|---|---|
| 5,862,325 A | 1/1999 | Reed et al. |
| 5,867,665 A | 2/1999 | Butman et al. |
| 5,867,667 A | 2/1999 | Butman et al. |
| 5,870,562 A | 2/1999 | Butman et al. |
| 5,878,056 A | 3/1999 | Black et al. |
| 5,884,035 A | 3/1999 | Butman et al. |
| 5,890,167 A | 3/1999 | Bridge, Jr. et al. |
| 5,918,059 A | 6/1999 | Tavallaei et al. |
| 5,933,604 A | 8/1999 | Inakoshi |
| 5,940,839 A | 8/1999 | Chen et al. |
| 5,951,694 A | 9/1999 | Choquier et al. |
| 5,970,439 A | 10/1999 | Levine et al. |
| 5,995,980 A | 11/1999 | Olson et al. |
| 5,999,931 A | 12/1999 | Breitbart et al. |
| 6,026,430 A | 2/2000 | Butman et al. |
| 6,029,205 A | 2/2000 | Alferness et al. |
| 6,035,379 A | 3/2000 | Raju et al. |
| 6,041,357 A | 3/2000 | Kunzelman et al. |
| 6,058,389 A | 5/2000 | Chandra et al. |
| 6,067,540 A | 5/2000 | Hyde |
| 6,073,129 A | 6/2000 | Levine et al. |
| 6,088,728 A | 7/2000 | Bellemore et al. |
| 6,178,529 B1 | 1/2001 | Short et al. |
| 6,182,086 B1 | 1/2001 | Lomet et al. |
| 6,185,555 B1 | 2/2001 | Sprenger et al. |
| 6,188,699 B1 | 2/2001 | Lang et al. |
| 6,192,378 B1 | 2/2001 | Abrams et al. |
| 6,222,840 B1 | 4/2001 | Walker et al. |
| 6,243,751 B1 | 6/2001 | Chatterjee et al. |
| 6,247,017 B1 | 6/2001 | Martin |
| 6,304,882 B1 | 10/2001 | Strellis et al. |
| 6,327,622 B1 | 12/2001 | Jindal et al. |
| 6,334,114 B1 | 12/2001 | Jacobs et al. |
| 6,338,074 B1 | 1/2002 | Poindexter et al. |
| 6,393,423 B1 | 5/2002 | Goedken |
| 6,427,146 B1 | 7/2002 | Chu |
| 6,442,568 B1 | 8/2002 | Velasco et al. |
| 6,466,950 B1 | 10/2002 | Ono |
| 6,473,794 B1 | 10/2002 | Guheen et al. |
| 6,490,574 B1 | 12/2002 | Bennett et al. |
| 6,493,826 B1 | 12/2002 | Schofield et al. |
| 6,515,968 B1 | 2/2003 | Combar et al. |
| 6,519,571 B1 | 2/2003 | Guheen et al. |
| 6,529,932 B1 | 3/2003 | Dadiomov et al. |
| 6,536,037 B1 | 3/2003 | Guheen et al. |
| 6,539,381 B1 | 3/2003 | Prasad et al. |
| 6,556,659 B1 | 4/2003 | Bowman-Amuah |
| 6,560,592 B1 | 5/2003 | Reid et al. |
| 6,587,866 B1 | 7/2003 | Modi et al. |
| 6,601,101 B1 | 7/2003 | Lee et al. |
| 6,654,907 B2 | 11/2003 | Stanfill et al. |
| 6,658,596 B1 | 12/2003 | Owen |
| 6,691,155 B2 | 2/2004 | Gottfried |
| 6,697,791 B2 | 2/2004 | Hellerstein et al. |
| 6,704,831 B1 | 3/2004 | Avery |
| 6,704,886 B1 | 3/2004 | Gill et al. |
| 6,728,748 B1 | 4/2004 | Mangipudi et al. |
| 6,757,710 B2 | 6/2004 | Reed |
| 6,769,074 B2 | 7/2004 | Vaitzblit |
| 6,793,625 B2 | 9/2004 | Cavallaro et al. |
| 6,802,003 B1 | 10/2004 | Gross et al. |
| 6,816,907 B1 | 11/2004 | Mei et al. |
| 6,826,182 B1 | 11/2004 | Parthasarathy |
| 6,826,579 B1 | 11/2004 | Leymann et al. |
| 6,850,893 B2 | 2/2005 | Lipkin et al. |
| 6,868,413 B1 | 3/2005 | Grindrod et al. |
| 6,882,994 B2 | 4/2005 | Yoshimura et al. |
| 6,889,231 B1 | 5/2005 | Souder et al. |
| 6,917,946 B2 | 7/2005 | Corl, Jr. et al. |
| 6,925,476 B1 | 8/2005 | Multer et al. |
| 6,980,988 B1 | 12/2005 | Demers et al. |
| 7,003,531 B2 | 2/2006 | Holenstein et al. |
| 7,031,974 B1 | 4/2006 | Subramaniam |
| 7,058,957 B1* | 6/2006 | Nguyen ............ 719/318 |
| 7,065,537 B2 | 6/2006 | Cha et al. |
| 7,089,228 B2 | 8/2006 | Arnold et al. |
| 7,095,871 B2 | 8/2006 | Jones et al. |
| 7,149,738 B2 | 12/2006 | Kumar et al. |
| 7,174,379 B2 | 2/2007 | Agarwal et al. |
| 7,177,866 B2 | 2/2007 | Holenstein et al. |
| 7,178,050 B2 | 2/2007 | Fung et al. |
| 7,243,256 B2 | 7/2007 | Kaiya et al. |
| 7,263,590 B1 | 8/2007 | Todd et al. |
| 7,269,157 B2 | 9/2007 | Klinker et al. |
| 2001/0032137 A1 | 10/2001 | Bennett et al. |
| 2001/0047270 A1 | 11/2001 | Gusick et al. |
| 2001/0052137 A1 | 12/2001 | Klein |
| 2001/0056493 A1 | 12/2001 | Mineo |
| 2002/0049845 A1* | 4/2002 | Sreenivasan et al. ......... 709/226 |
| 2002/0052885 A1 | 5/2002 | Levy |
| 2002/0073139 A1 | 6/2002 | Hawkins et al. |
| 2002/0091685 A1 | 7/2002 | Feldman et al. |
| 2002/0112008 A1 | 8/2002 | Christenson et al. |
| 2002/0116457 A1 | 8/2002 | Eshleman et al. |
| 2002/0129157 A1 | 9/2002 | Varsano |
| 2002/0133507 A1 | 9/2002 | Holenstein et al. |
| 2002/0138582 A1 | 9/2002 | Chandra et al. |
| 2002/0144010 A1 | 10/2002 | Younis et al. |
| 2002/0161896 A1 | 10/2002 | Wen et al. |
| 2002/0194015 A1 | 12/2002 | Gordon et al. |
| 2002/0194081 A1 | 12/2002 | Perkowski |
| 2003/0005028 A1 | 1/2003 | Dritschler et al. |
| 2003/0007497 A1 | 1/2003 | March et al. |
| 2003/0014523 A1 | 1/2003 | Teloh et al. |
| 2003/0037029 A1 | 2/2003 | Holenstein et al. |
| 2003/0037146 A1 | 2/2003 | O'Neill |
| 2003/0039212 A1 | 2/2003 | Lloyd et al. |
| 2003/0046421 A1 | 3/2003 | Horvitz et al. |
| 2003/0088671 A1 | 5/2003 | Klinker et al. |
| 2003/0108052 A1 | 6/2003 | Inoue et al. |
| 2003/0110085 A1 | 6/2003 | Murren et al. |
| 2003/0135523 A1 | 7/2003 | Brodersen et al. |
| 2003/0135609 A1 | 7/2003 | Carlson et al. |
| 2003/0135642 A1* | 7/2003 | Benedetto et al. ............ 709/238 |
| 2003/0161468 A1 | 8/2003 | Iwagaki et al. |
| 2003/0177187 A1 | 9/2003 | Levine et al. |
| 2003/0208523 A1 | 11/2003 | Gopalan et al. |
| 2003/0212657 A1 | 11/2003 | Kaluskar et al. |
| 2003/0212670 A1 | 11/2003 | Yalamanchi et al. |
| 2003/0236834 A1 | 12/2003 | Gottfried |
| 2004/0024771 A1 | 2/2004 | Jain et al. |
| 2004/0024774 A1 | 2/2004 | Jain et al. |
| 2004/0024794 A1 | 2/2004 | Jain et al. |
| 2004/0024979 A1 | 2/2004 | Kaminsky et al. |
| 2004/0034640 A1 | 2/2004 | Jain et al. |
| 2004/0034664 A1 | 2/2004 | Jain et al. |
| 2004/0064548 A1 | 4/2004 | Adams et al. |
| 2004/0093512 A1 | 5/2004 | Sample |
| 2004/0103195 A1 | 5/2004 | Chalasani et al. |
| 2004/0107125 A1 | 6/2004 | Guheen et al. |
| 2004/0111506 A1 | 6/2004 | Kundu et al. |
| 2004/0117794 A1 | 6/2004 | Kundu |
| 2004/0133591 A1 | 7/2004 | Holenstein et al. |
| 2004/0162859 A1* | 8/2004 | Guo et al. ..................... 707/204 |
| 2004/0176996 A1 | 9/2004 | Powers et al. |
| 2004/0181476 A1 | 9/2004 | Smith et al. |
| 2004/0268357 A1 | 12/2004 | Joy et al. |
| 2005/0010545 A1 | 1/2005 | Joseph |
| 2005/0021567 A1 | 1/2005 | Holenstein et al. |
| 2005/0021771 A1 | 1/2005 | Kaehn et al. |
| 2005/0125371 A1 | 6/2005 | Bhide et al. |
| 2005/0165925 A1 | 7/2005 | Dan et al. |
| 2005/0183072 A1 | 8/2005 | Horning et al. |
| 2005/0193024 A1 | 9/2005 | Beyer et al. |
| 2005/0239476 A1 | 10/2005 | Betrabet et al. |
| 2005/0262205 A1 | 11/2005 | Nikolov et al. |
| 2005/0267965 A1 | 12/2005 | Heller |
| 2006/0036617 A1 | 2/2006 | Bastawala et al. |
| 2006/0112135 A1 | 5/2006 | Warshawsky |
| 2007/0226323 A1 | 9/2007 | Halpern |
| 2012/0143919 A1 | 6/2012 | Idicula |

FOREIGN PATENT DOCUMENTS

| | | |
|---|---|---|
| EP | 0942363 A2 | 9/1999 |
| EP | 0959416 A2 | 11/1999 |
| EP | 0 992 909 A2 | 4/2000 |
| EP | 1 170 662 A2 | 1/2002 |

| | | | |
|---|---|---|---|
| EP | 1 260 902 A2 | 5/2002 |
| WO | WO 0010084 A | 2/2000 |
| WO | WO 01/08048 A | 2/2001 |
| WO | WO 02/05116 A2 | 1/2002 |
| WO | WO 02/07037 A | 1/2002 |
| WO | WO 02/07037 A1 | 1/2002 |
| WO | WO 02/097676 A2 | 12/2002 |
| WO | WO 03/014928 A | 2/2003 |
| WO | WO 03/014928 A1 | 2/2003 |
| WO | WO 03/014929 A | 2/2003 |
| WO | WO 03/062983 A | 7/2003 |
| WO | WO 03/062983 A2 | 7/2003 |
| WO | WO 03/063450 A1 | 7/2003 |

OTHER PUBLICATIONS

International Searching Authority, "Notification of Transmittal of the International Search Report or the Declaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

Ravi Kokku et al., "Half-pipe Anchoring: An Efficient Technique for Multiple Connection Handoff," Proceedings 10$^{th}$ International Conference on Network Protocols, Nov. 12, 2002, XP0106032563, 10 pages.

Ying-Dar Lin et al., "Direct Web Switch Routing with State Migration, TCP Masquerade, and Cookie Name Rewriting," Globecom 2003, IEEE Global Telecommunications Conference, Dec. 1, 2003, IEEE, CP010677300, pp. 3663-3667.

International Search Authority, "Notification of Transmittal of the International Search Report and the Written Opinion of the International Searching Authority, or the Declaration," Nov. 12, 2004, 13 pages.

Current Claims of International Application No. PCT/US2004/026570, 4 pages.

Current Claims of International Application No. PCT/US2004/025805, 8 pages.

International Search Authority, "Notification of Transmittal of the International Search Report and the Written Opinion of the International Searching Authority, or the Declaration," dated Dec. 3, 2004, 12 pages.

International Searching Authority, "Notification of Transmittal of the International Search Report and the Written Opinion of the International Searching Authority, or the Declaration," PCT/US2004/026405, dated Jan. 6, 2006, 13 pages.

Current Claims, PCT/US2004/026405, 7 pages.

Chase, Jeffrey S., et al., "Dynamic Virtual Clusters in a Grid Site Manager," Proceedings of the 12$^{th}$ IEEE International Symposium on High Performance Distributed Computing, 2003, XP-010643715, 12 pgs.

Chase, Jeffrey S., "Dynamic Virtual Clusters in a Grid Site Manager," Proceedings of the IEEE International Symposium on HPDC-2003, XP010463715, pp. 90-100.

International Searching Authority, "Notification of the Transmittal of the International Search Report and the Written Opinion of the International Searching Authority, or the Declaration", PCT/US2004/026405, dated Aug. 19, 2005, 5 pages.

Claims, PCT/US2004/026405, 7 pages.

"Office Action" received in related case 10/917,661, filed Aug. 12, 2004, 9 pages.

"Office Action" received in related case 10/918,056, filed Aug. 12, 2004, 9 pages.

"Office Action" received in related case 10/917,687, filed Aug. 12, 2004, 9 pages.

Office Action from CN for foreign patent Application No. 03821299.4 dated Dec. 24, 2007 (4 pgs) with English translation (4 pgs).

Current claims in CN for foreign patent Application No. 03821299.4 (6 pgs).

* cited by examiner

RECOVERABLE ASYNCHRONOUS MESSAGE DRIVEN PROCESSING IN A MULTI-NODE SYSTEM

RELATED CASES

The present application claims priority to U.S. Provisional Application No. 60/495,368, Computer Resource Provisioning, filed on Aug. 14, 2003, which is incorporated herein by reference; the present application claims priority to U.S. Provisional Application No. 60/500,096, Service Based Workload Management and Measurement in a Distributed System, filed on Sep. 3, 2003, which is incorporated herein by reference; the present application claims priority to U.S. Provisional Application No. 60/500,050, Automatic And Dynamic Provisioning Of Databases, filed on Sep. 3, 2003, which is incorporated herein by reference.

The present application is related to the following U.S. Applications:

U.S. application Ser. No. 10/718,747, Automatic and Dynamic Provisioning of Databases, filed on Nov. 21, 2003, which is incorporated herein by reference;

U.S. application Ser. No. 10/917,873, Hierarchical Management of the Dynamic Allocation of Resources in a Multi-Node System, filed by Benny Souder, et al, on the equal day herewith, and incorporated herein by reference;

U.S. application Ser. No. 10/917,953, Transparent Session Migration Across Servers, filed by Sanjay Kaluskar, et al, on the equal day herewith and incorporated herein by reference;

U.S. application Ser. No. 10/917,661, Calculation of Service Performance Grades in a Multi-Node Environment That Hosts the Services, filed by Lakshminarayanan Chidambaran, et al, on the equal day herewith and incorporated herein by reference;

U.S. application Ser. No. 10/918,055, Incremental Run-Time Session Balancing in a Multi-Node System filed by Lakshminarayanan Chidambaran, et al, on the equal day herewith and incorporated herein by reference;

U.S. application Ser. No. 10/918,056, Service Placement for Enforcing Performance and Availability Levels in a Multi-Node System, filed by Lakshminarayanan Chidambaran, et al, on the equal day herewith and incorporated herein by reference;

U.S. application Ser. No. 10/917,687, On Demand Node and Server Instance Allocation and De-Allocation, filed by Lakshminarayanan Chidambaran, et al, on the equal day herewith and incorporated herein by reference; and U.S. application Ser. No. 10/917,715, Managing Workload by Service, filed by Carol Colrain, et al, on the equal day herewith and incorporated herein by reference.

FIELD OF THE INVENTION

The present invention relates to efficiency and recovery of message driven processing in a computer system, and in particular, the efficiency and recovery of message driven work load management within a multi-node computer system.

BACKGROUND OF THE INVENTION

Enterprises are looking at ways of reducing costs and increasing efficiencies of their data processing system. A typical enterprise data processing system allocates individual resources for each of the enterprise's applications. Enough resources are acquired for each application to handle the estimated peak load of the application. Each application has different load characteristics; some applications are busy during the day; some others during the night; some reports are run once a week and some others once a month. As a result, there is a lot of resource capacity that is left unutilized. Grid computing enables the utilization or elimination of this unutilized capacity. In fact, grid computing is poised to drastically change the economics of computing.

A grid is a collection of computing elements that provide processing and some degree of shared storage; the resources of a grid are allocated dynamically to meet the computational needs and priorities of its clients. Grid computing can dramatically lower the cost of computing, extend the availability of computing resources, and deliver higher productivity and higher quality. The basic idea of grid computing is the notion of computing as a utility, analogous to the electric power grid or the telephone network. A client of the grid does not care where its data is or where the computation is performed. All a client wants is to have computation done and have the information delivered to the client when it wants.

At a high level, the central idea of grid computing is computing as a utility. A client of a grid should not have to care where its data resides, or what computer element processes a request. The client need only request information or computation and have it delivered—as much as needed whenever needed. This is analogous to the way electric utilities work; a customer does not know where the generator is, or how the electric grid is wired. The customer just asks for electricity and gets it. The goal is to make computing a utility—a ubiquitous commodity. Hence it has the name, the grid.

This view of grid computing as a utility is, of course, a client side view. From the server side, or behind the scenes, the grid is about resource allocation, information sharing, and high availability. Resource allocation ensures that all those that need or request resources are getting what they need. Resources are not standing idle while requests are left unserviced. Information sharing makes sure that the information clients and applications need is available where and when it is needed. High availability ensures that all the data and computation must always be there—just as a utility company must always provide electric power.

Grid Computing for Databases

One area of computer technology that can benefit from grid computing is database technology. A grid can support multiple databases and dynamically allocate and reallocate resources as needed to support the current demand for each database. As the demand for a database increases, more resources are allocated for that database, while other resources are deallocated from another database. For example, on an enterprise grid, a database is being serviced by one database server running on one server blade on the grid. The number of users requesting data from the database increases. In response to this increase in the demand for the database, a database server for another database is removed from one server blade and a database server for the database experiencing increased user requests is provisioned to the server blade.

Grid computing for databases can require allocation and management of resources at different levels. At a level corresponding to a single database, the performance and resource availability provided to the users of the database must be monitored and resources of the database allocated between the users to ensure performance and resource availability goals for each of the users are met. Between databases, the allocation of a grid's resources must be managed to ensure that performance and resource availability goals for users of all the databases are met. The work to manage allocation of resources at these different levels and the information needed to perform such management is very complex. Therefore, there is a need for a mechanism that simplifies and efficiently handles the management of resources in a grid computing system for database systems as well as other types of systems that allocate resources at different levels within a grid.

One such mechanism is the system described in Hierarchical Management of the Dynamic Allocation of Resources in a Multi-Node System Ser. No. 10/917,873, which uses a hierarchy of directors to manage resources at different levels. One type of director, a database director, manages resources allocated to a database among services that use a database and its database instances. The database director manages the allocation of database instances among the services. Another director, a cluster director, manages resources of a cluster of nodes between multi-node database servers hosted on the cluster. Yet another director, a farm director, manages resources allocated between clusters.

For each database, cluster, and farm director, one or more other standby directors sit idle waiting, ready to take over the responsibility of a database, cluster, or farm director that crashes. For example, multiple database instances for a database are running on multiple nodes. A database director runs on one of the database instances, while standby directors run on each of the other database instances. When a database director encounters a system failure, the standby director takes over as database director and assumes the crashed director's responsibilities. Directors that are currently performing the role and responsibility of a database director, cluster director, or farm director, rather serving as standbys, are referred to herein as active directors.

The directors are message driven, that is, they take action in response to messages transmitted to them from multiple sources. Specifically, each of the active directors receives messages notifying them of performance related events and conditions to which an active director may respond to by taking "remedial actions", which are actions taken to adjust allocation of resources. While a director is a performing a remedial action, other such messages may be received. If the director crashes while performing the remedial action, and a standby director steps in, it is desirable that the standby director know or recover the messages the formerly active director had received and/or was acting upon and to respond to the messages as if the former director had not crashed.

Some of the remedial actions taken by a director are complex and have high latency, that is, require a relatively long time to complete once commenced. For example, in response to being notified that performance for a database has fallen below requirements, a cluster director may add an additional database instance for the database to a node already hosting another database instance. This operation may require that the already running database instance be brought down so that the additional database instance can be brought up. These operations can require a relatively long time to perform.

While a high latency action is being performed, other messages may be sent to the director. It is desirable that a director be able to respond to these notifications before the high latency action is completed.

Furthermore, a high latency action requires relatively numerous and complex operations, and is subject to greater risk of crashing. If a director performing a high latency action crashes, a long period of time may elapse before the failure is detected and a standby director steps in. It is desirable that a director undertakes a high latency action in a way that insulates the director from the risks of crashing and delay inherent to performing high latency operations.

Based on the foregoing, it is clearly desirable to have an approach for a group of entities taking action to adjust allocation of resources in response to messages, where the approach insulates the entities from the crashes caused by high latency actions and, in the case of a crash, allows a standby to recover messages sent to the crashed entity, including messages for which action had been commenced but not successfully completed.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for managing the allocation of resources in a multi-node environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is an approach for recovery of message driven directors responsible for dynamically allocating resources within a multi-node database system. The receipt of a message, the action taken in response to it, and other messages sent in furtherance of the action, are performed within a single transaction. In this way, the messages and other data are left in a state consistent with the message and action taken in response being fully processed or not processed at all. A standby director, stepping in for a crashed director, inherits a state consistent with where a crashed director last successfully completed an action.

In addition, the approach insulates directors from the special perils of performing high latency actions by delegating the performance of such actions to a job, (i.e. another process). After the job is launched, further action is required by a director whether the job completes successfully or not. Such post-launch actions include aborting the job if it is unable to complete its action within a period of time or processing the job results if the job did complete within the period of time. In the event the director crashes before performing these post-launch actions, the approach allows a standby director to perform the post-launch actions.

Illustrative Multi-Node Computer

Figure 1:
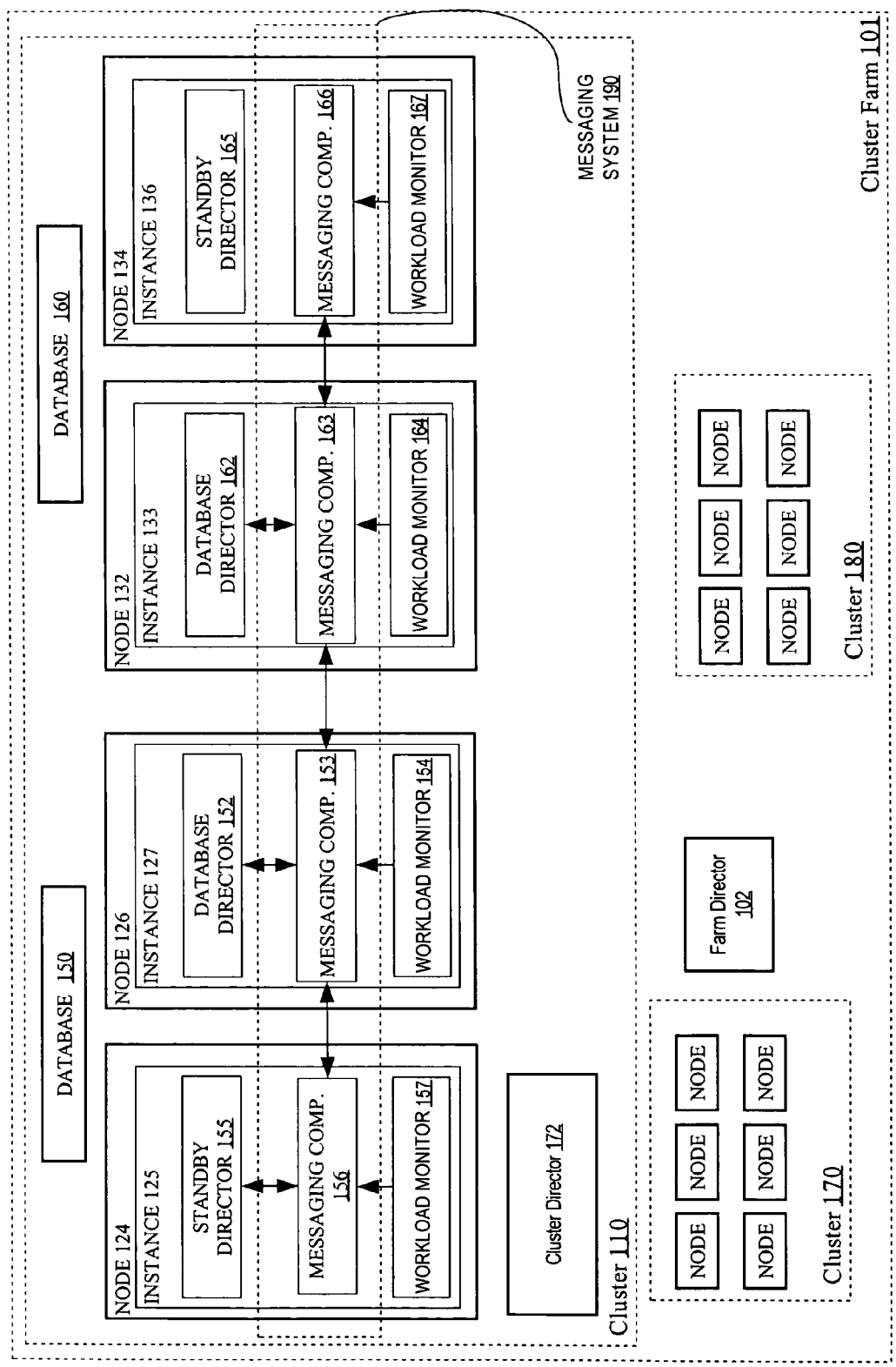
FIG. 1 is a block diagram showing a multi-node computer system on which an embodiment of the present invention may be implemented.

FIG. 1 shows a multi-node computer system that may be used to implement an embodiment of the present invention.

Referring to FIG. 1, it shows cluster farm 101. A cluster farm is a set of nodes that is organized into groups of nodes, referred to as clusters. Clusters provide some degree of shared storage (e.g. shared access to a set of disk drives) between the nodes in the cluster. Cluster farm 101 includes clusters 110, 170, and 180. Each of the clusters hosts one or more multi-node database servers that provide and manage access to databases. The nodes in a cluster farm may be in the form of computers (e.g. work stations, personal computers) interconnected via a network, and may be part of a grid.

A defining characteristic of a cluster in a cluster farm is that the cluster's nodes may be automatically transferred between clusters within the farm through software control without the need to physically reconnect the node from one cluster to another. A cluster farm is controlled and managed by software utilities referred to herein as clusterware. Clusterware may be executed to remove a node from a cluster and to provision the node to a cluster. Clusterware provides a command line interface that accepts requests from a human administrator, allowing the administrator to enter commands to provision and remove a node from a cluster. The interfaces may also take the form of Application Program Interfaces ("APIs"), which may be called by other software being executed within the cluster farm. Clusterware uses and maintains metadata that defines the configuration of a cluster within a farm, including cluster configuration metadata, which defines the topology of a cluster in a farm, including which particular nodes are in the cluster. The metadata is modified to reflect changes made to a cluster in a cluster farm by the clusterware. An example of clusterware is software developed by Oracle™, such as Oracle9i Real Application Clusters or Oracle Real Application Clusters 10g. Oracle9i Real Application Clusters is described in Oracle9i RAC: Oracle Real Application Clusters Configuration and Internals, by Mike Ault and Madhu Tumma, 2nd edition (Aug. 2, 2003).

Clusters and Multi-Node Database Servers

Clusters 110, 170, and 180 host one or more multi-node database servers. Cluster 110 hosts a multi-node database server for database 150, the multi-node database server comprising database instances 125 and 127, which are hosted on nodes 124 and 126, respectively. Cluster 110 also hosts a multi-node database server for database 160, the multi-node database server comprising database instances 133 and 135, which are hosted on nodes 132 and 134, respectively.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to a particular database, processing requests by clients to access the database.

Resources from multiple nodes in a multi-node computer system can be allocated to running a particular server's software. Each combination of the software and allocation of the resources from a node is a server that is referred to herein as a "server instance" or "instance". Thus, a multi-node server comprises multiple server instances that can run on multiple nodes. Several instances of a multi-node server can even run on the same node. A multi-node database server comprises multiple "database instances", each database instance running on a node, and governing and facilitating access to a particular database. Database instances 125 and 127 are instances of the same multi-node database server.

Services

A service is the performance of work of a particular type or category that is hosted for the benefit of one or more clients. One type of service is a database service. Cluster 110 provides a database service for accessing database 150 and a database service for accessing database 160. In general, a database service is work that is performed by a database server for a client, work that typically includes processing queries that require access to a particular database.

Like any service, a database service may be further categorized. Database services for database 150 are further categorized into the FIN service and PAY service (not shown). The FIN service is the database service performed by database instances 125 and 127 for the FIN application. Typically, this service involves accessing database objects on database 150 that store database data for FIN applications. The PAY services are database services performed by database instances 125 and 127 for the PAY application. Typically, this service involves accessing database objects on database 150 that store database data for PAY applications.

Sessions

In order for a client to interact with a database server on cluster 110, a session is established for the client. A session, such as a database session, is a particular connection established for a client to a server, such as a database instance, through which the client issues a series of requests (i.e. requests for execution of database statements). For each database session established on a database instance, session state data is maintained that reflects the current state of a database session. Such information contains, for example, the identity of the client for which the session is established, and temporary variable values generated by processes executing software within the database session.

Monitoring Workload

Resources are allocated and re-allocated to meet levels of performance and cardinality constraints on the resources. These levels of performance and cardinality constraints are collectively referred to herein as service-level agreements. Levels of performance and cardinality constraints on resources that apply to a multi-node system in general and not necessarily to a particular service are referred to herein as policies. For example, a service-level agreement for service FIN maybe require that the average transaction time for service FIN be no more than a given threshold, and as an availability requirement that at least two instances host service FIN. A policy may require that the CPU utilization of any node should not exceed 80%.

Policies may also be referred to herein as backend policies because they are used by backend administrators to manage overall system performance and to allocate resources between a set of services when it is deemed there are insufficient resources to meet service-level agreements of all the set of services. For example, a policy assigns a higher priority to a database relative to another database. When there are insufficient resources to meet service-level agreements of services of both databases, the database with the higher priority, and the services that use the database, will be favored when allocating resources.

To meet service-level agreements, a mechanism is needed to monitor and measure workload placed on various resources. A workload monitor is a process that runs on a node of a cluster to monitor and measure workload. Database instances 125, 127, 133, and 136 host work load monitors 157, 154, 164, and 167. A work load monitor generates "performance metrics".

Performance metrics are data that indicate the level of performance for one or more resources. Performance metrics generated by a workload monitor on a database instance can be consolidated by the services hosted on the database instance to indicate the level of performance realized for each of the services. Approaches for monitoring workload and performance and generating performance metrics are described in On Demand Node and Server Instance Allocation and De-Allocation Ser. No. 10/917,687.

A performance metric of a particular type that can be used to gauge a characteristic or condition that indicates a level of performance or workload is referred to herein as a performance measure. A performance measure includes for example, transaction execution time or percent of CPU utilization. In general, service-level agreements that involve levels of performance can be defined by thresholds and criteria that are based on performance measures.

The workload monitor detects violations of service-level agreements, herein referred to as service-level violations. For example, workload monitor 157 periodically analyzes performance metrics and determines that the average transaction time for FIN on instance 125 violates the service-level agreement for this measure or determines that the percent CPU utilization on node 124 for service FIN violates the policy for CPU utilization. When a workload monitor detects a service-level violation, it transmits a message, referred to herein as a service-level alert message, to a database director. The director, once notified in this way, takes one or more remedial actions to resolve the service-level violations.

As a result of taking one or more types of remedial actions, the service-level violation abates (i.e. disappears). A workload monitor detects this outcome and transmits an alert cancellation message to the database director to communicate that the service-level violation no longer exists.

Hierarchy Of Directors

A hierarchy of directors, such as that described in Hierarchical Management of the Dynamic Allocation of Resources in a Multi-Node System Ser. No. 10/917,873, is used to dynamically adjust the allocation of resources within cluster farm 101 to meet service-level agreements. Cluster farm 101 includes a database director for each database on cluster farm 101, a cluster director for each cluster within cluster farm 101, and a farm director for cluster farm 101.

A director is a system component. A system component is a combination of software, data, and one or more processes that execute that software and that use and maintain the data to perform a particular function. Preferably, but not necessarily, a director is a system component of a database instance and is operating under the control of the database instance.

A database director, such as database director 152 and database director 162, dynamically manages and adjusts the allocation of resources of a database between services hosted by the database instances of the database. One type of remedial action taken by a database director is to perform incremental runtime session balancing between the database instances of a database as described in Incremental Run-Time Session Balancing in a Multi-Node System Ser. No. 10/918,055. Incremental runtime session balancing migrates the database sessions of a service between database instances hosting the service. Another remedial action taken by a database director is service expansion. Under service expansion, another database instance is allocated to host a service, as described in Service Placement for Enforcing Performance and Availability Levels in a Multi-Node System Ser. No. 10/918,056.

A cluster director, such as cluster director 172, manages and adjusts allocation of resources between databases. One type of remedial action a cluster director takes is to add or remove a database instance for a database to or from an existing node within a cluster, as described herein in greater detail. Cluster director 172 runs on a node (the node not being shown) within cluster 110.

A farm director, such as farm director 102, manages and adjusts allocation of resources between clusters. One type of remedial action a farm director undertakes to perform this responsibility is to add or remove a node to or from a cluster. Farm director 172 runs on a node (the node not being shown) within farm 101.

In general, the directors adjust allocation of resources in response to resource alerts. A resource alert is the detection of a condition or event which triggers attention to resource allocation within a multi-node computer system. Resource alerts include service-level alerts, service-level alerts being the detection of service-level violations. As mentioned before, workload monitors send service-level alert messages to directors when the workload monitors detect a service-level violation. Directors also send resource alerts to other directors to request a particular action, such as providing another database instance for a database. Resource alerts and resource alert messages are referred to herein as alerts and alert messages.

Messaging System

Messages are transmitted to and from directors using a messaging system 190. Messaging system 190 is distributed, having system components ("messaging components") that reside on multiple nodes. Transactional messaging system 190 includes messaging components 156, 153, 163, and 166, which reside on instances 125, 127, 133, and 136, respectively. A messaging component includes software and data required for the database instance on which the messaging component resides to support the transmission of messages between clients of messaging system 190, such as directors 155, 152, 162, and 165, that are hosted on the same database instance as the messaging component. A messaging component that resides on a database instance and node is referred to as being local to each other and other clients that reside on the same database instance.

In general, a "source client" of messaging system 190 sends a message to a "destination client" by transmitting a request to send the message to the "source messaging component", the local messaging component of the source client. The source messaging component transmits the message to the "destination messaging component", which is the local messaging component of the destination client.

Messages transmitted to a client via messaging system 190 may be associated with a due date/time. A message associated with due date/time that is equal to or greater than the current point of time is referred to as a pending message. A message that is not associated with any particular due date/time is also pending message. A messaging client can request from a messaging component pending messages, to which the messaging component responds by returning only pending messages.

Messaging System is Transaction Oriented

Messaging system 190 is transaction oriented in that messaging actions taken by clients can be performed as part of a transaction. Such messaging actions include transmitting or receiving a message. Messaging actions can cause changes to database state. A transaction is a logical unit of work that is performed as an atomic unit. In the context of database systems, the database must reflect all the changes made by a transaction, or none of the changes made by the transaction to ensure of integrity of the database. Consequently, none of the changes made by a transaction are permanently applied to a database until the transaction has been fully executed. A transaction is said to "commit" when the changes made by the transaction are made permanent.

The receipt and transmission of messages via messaging system 190 by a messaging client may be executed as part of one transaction. The receipt and transmission are not treated as completed until the transaction completes.

For example, workload monitor 164 detects a service-level violation for a service hosted on database instance 133. Workload monitor 164 transmits a service-level alert message to director 162 via local messaging component 163. Messaging component 163 adds the service-level alert message to a message queue for the director, referred to herein as the directors' message queue. When database director 162 requests a pending message from local messaging component 163, messaging component 163 provides the message, and in so doing, dequeues the message. The term queue is used herein to refer to a list of data items that are ordered according to when they should be processed. Dequeueing a message refers to changing a message queue to reflect the "removal" of the message from the message queue. The message queue may be a table within database 160. Dequeueing may involve deleting a record corresponding to the message from the queue, or changing values in the record to logically remove the message from the message queue as an unprocessed message.

When a database director 162 gets the service-level alert message from the directors' message queue, the director decides to transmit a request to cluster director 172 to request another database instance for the director's database. Database director 162 submits an alert message to messaging component 163 requesting that the cluster director 172 provide another database instance for database 160. Messaging component 163 queues (i.e. adds) a message to a "staging" queue, where messages may be transmitted to another messaging component. Adding the message to the staging queue may involve inserting a record corresponding to the message.

Finally, database director 162 commits the transaction. The changes made to database 160, including the dequeueing of the service-level alert message, the queueing of the message in the staging queue, are then made persistent. After committing the insertion of the record into the staging queue, the message is transmitted to a recipient.

If the transaction were not committed, then the changes made to the directors and staging message queues would not have been persistent. In effect, the service-level alert message would remain in the directors' message queue and the message that would have been transmitted to database director 152 would never have been added to the staging queue.

Various messaging systems that may be used in an embodiment are described in *Oracle 9i, Streams*, Volumes 1 & 2 (Part Numbers B1007-01 and B1008-02, respectively, available from Oracle Corporation), the contents of which are incorporated herein by reference.

A directors' queue may hold other types of messages other than resource alerts. For example, administrative commands, such as a command for a director to shut down, may be transmitted to a director and queued in the directors' queue. Also job results, escalations, escalation responses, alerts to be retried later, and quiese request messages are also held in the directors' queue.

Transactional Loop

According to an embodiment, directors perform actions to resolve resource alerts as part of a transactional loop, a loop in which messaging, remedial actions, and other actions taken in response to a resource alert, and the changes to a database made concomitant to these actions, including database changes to message queues, are made as a single transaction.

Figure 2:
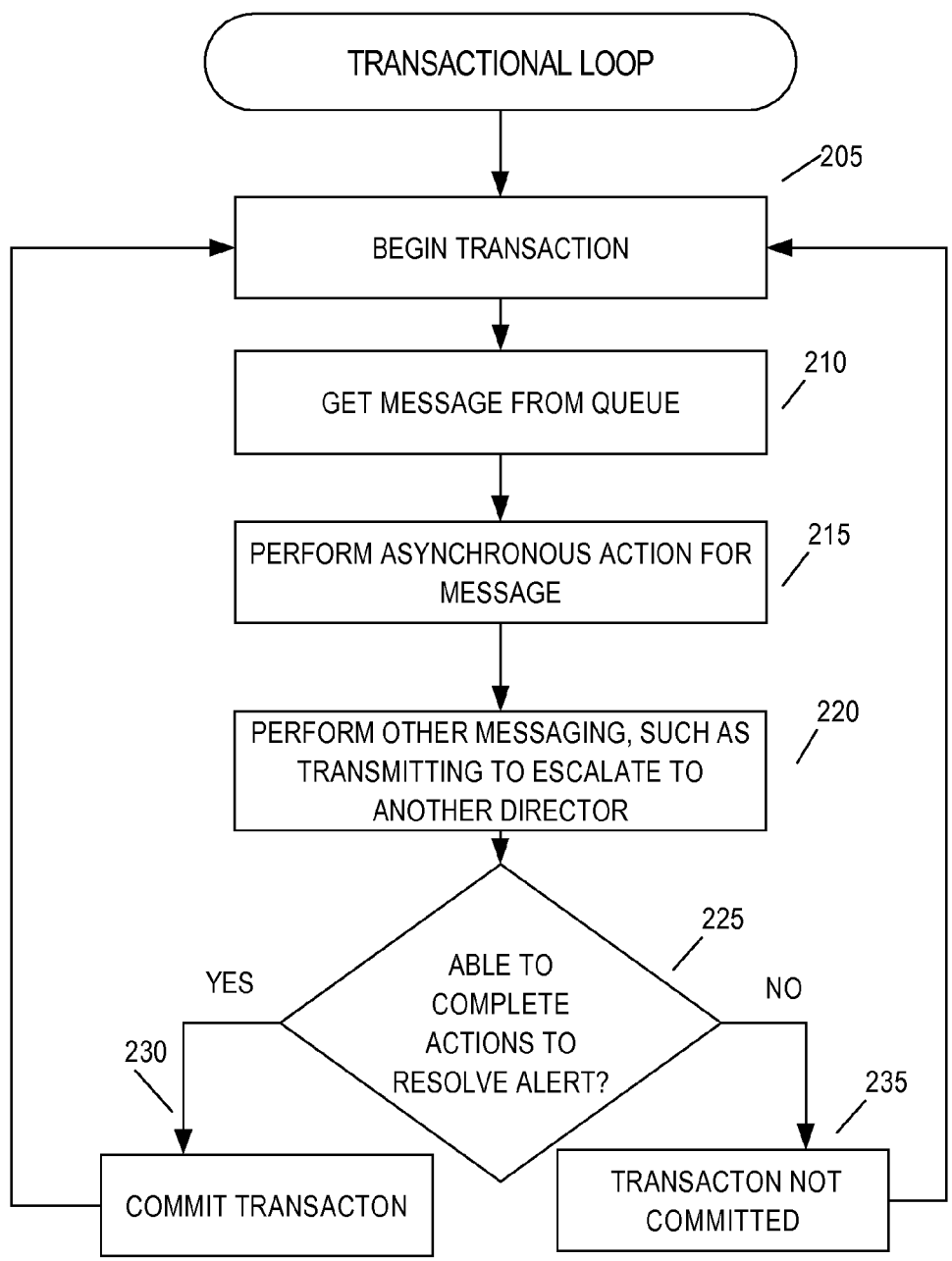
FIG. 2 is a flow chart showing a transactional loop according to an embodiment of the present invention.

FIG. 2 is a flowchart showing the framework of a transactional loop according to an embodiment of the present invention. The steps are performed by or caused by either a database, cluster, or farm director.

Referring to FIG. 2, at step 205, the director begins a transaction. At step 210, the director retrieves an alert message from its local messaging component. The retrieval of the message dequeues the message from the directors' queue.

At step 215, the director performs a remedial action in response to the alert. The remedial action can take many forms, and depends on the type of director performing step 215. For example, an alert may be a service-level alert and the director performing step 215 is a database director. In this case, the director may perform run-time session balancing or service expansion to remedy the underlying service-level violation. Alternately, the database director may determine that resolution of the service-level alert requires another database instance and should be escalated to the cluster director by transmitting a "need-instance" request to the cluster director.

As another example, a cluster director may be performing the steps of a transactional loop, and the resource alert message the cluster director got at step 210 is a "need-instance" request. The remedial action being performed at step 215 is to provision another database instance, as described in On Demand Node and Server Instance Allocation and De-Allocation Ser. No. 10/917,687.

This step may involve changes to database state, such as tables the director uses to manage the processing of resource alerts. Examples of such state changes include logging of the various actions taken and the reasons for taking those actions, etc. Such state is later used for analysis by a human administrator or programmatically by the director itself for performing future actions.

At step 220, other messaging is performed. Such other messaging includes, for example, transmitting messages needed to escalate resolution of a service-level alert in case of a database director or transmitting escalation responses/quiese requests to other databases in the case of the cluster director.

After performing an iteration of the loop, the database state is left consistent with either the alert being fully processed or not being processed at all. If a director executing a transaction in the loop is unable to complete the actions undertaken to resolve an alert (step 225), and therefore is unable to commit the transaction, the director or a standby director can reprocess the alert as if it had not been processed at all beforehand (step 235). The resource alert message for the resource alert remains in the directors' queue. Other database state is accordingly consistent. If a director is successful in completing the actions undertaken to resolve an alert, the transaction is committed (Step 230).

Remanding Service-Level Alert Messages

Actions undertaken by a database director in a transactional loop to resolve a resource alert may be performed multiple times before the resource alert is finally resolved. For example, as explained in Incremental Run-Time Session Balancing in a Multi-Node System Ser. No. 10/918,055, run-time session balancing can be performed multiple times to eliminate a service-level violation. Because a remedial action taken by a director may not eliminate a service-level violation, a service-level alert message is remanded to messaging system 190, to cause the director to later redress the service-level alert if needed. The remanded message, when submitted, is associated with a future "due date/time". In the future, when the remanded message becomes pending, and the database director retrieves the remanded message as a pending message, the database director may take another remedial action.

After a database director remands a message, a workload monitor may transmit an alert cancellation message for a service-level alert. While executing an iteration of the transactional loop, the database director gets the alert cancellation message. In response, the director requests that the local messaging component dequeue the remanded service-level alert message that corresponds to the service-level alert, thereby stopping the director from taking any further remedial action with respect to the service-level alert.

Transactional Loop Using Asynchronous Jobs

Figure 3:
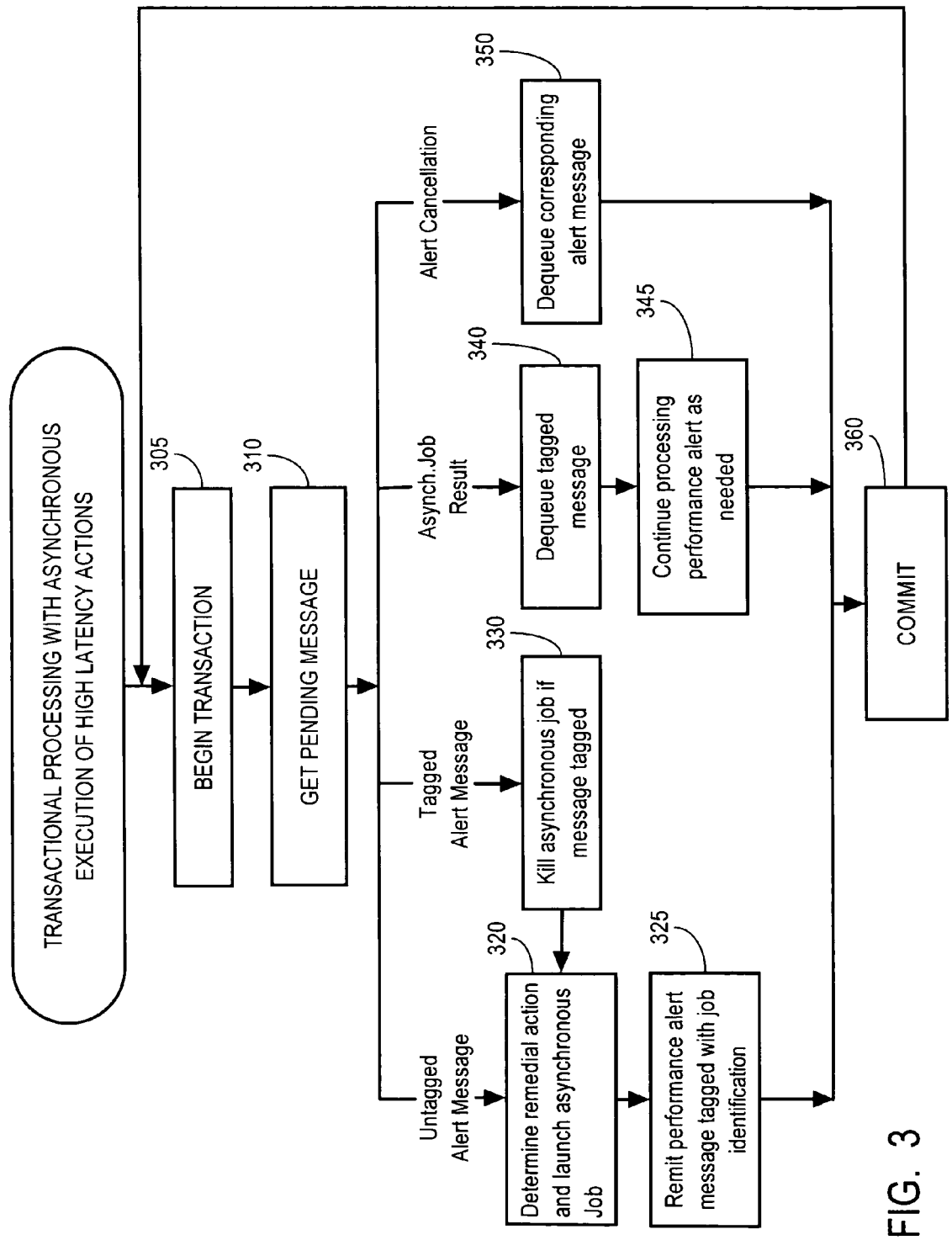
FIG. 3 is a flow chart showing a transactional loop that includes processing of asynchronous jobs according to an embodiment of the present invention.

Many of the remedial actions taken to adjust allocation of resources and resolve alerts are high latency operations. As mentioned previously, high latency operations require a relatively long period of time to perform and subject the process performing the remedial action to greater risk of failure. FIG. 3 shows a procedure that enables a director to initiate high latency remedial actions while avoiding the perils attendant to high latency remedial actions, according to an embodiment of the present invention. The procedure delegates the performance of high latency remedial actions to an asynchronous job. An asynchronous job is another computer process, operating under the control of an operating system and/or a database instance, that is different than and runs independent of another process, such as the director's process. Because the asynchronous job performs the high latency remedial action, rather than a director, the director is not subject to the risk of failures attendant to high latency remedial actions and is free to process other resource alerts from the directors' message queue.

Referring to FIG. 3, at step 305, a director begins a transaction. At step 310, the director gets a pending alert message. At this stage, the procedure can follow multiple paths, depending on the type of pending alert message obtained. FIG. 3 shows four such paths; an embodiment of the present invention may have more or less.

Untagged Alert Message

If the alert message is a service-level alert message that is not tagged with the identification of an asynchronous job, then the procedure proceeds to step 320. A service-level alert message tagged in this way shall be later described. For a service-level violation, the first service-level alert message generated by a workload monitor is not tagged.

At step 320, the director determines a remedial action to take and launches an asynchronous job to complete the remedial action. An identifier is generated for the asynchronous job. For example, a database director determines that incremental run-time session balancing should be performed between database instances. The database director launches an asynchronous job to perform the action and an identifier is generated for the job. As another example, a cluster director determines that a database instance is to be quiesced on a particular node, as described in On Demand Node and Server Instance Allocation and De-Allocation Ser. No. 10/917,687. The cluster director launches an asynchronous job to perform this task and an identifier is generated for the job.

At step 325, a service-level alert message is remanded to the directors' message queue, with a future due date/time, and tagged with the job identification. The job identification may be used later to identify the remanded service-level alert message within the directors' queue, as shall be described in greater detail. The term tag refers to storing data in association with a particular message, by, for example, including the identification within a field of the record corresponding to the remanded service-level alert message in the directors' message queue.

The due date/time may be based on the period of time required for the job to perform its task, such that the due data/time is not reached until the period of time elapses. Once the period of time elapses, the remanded alert becomes a pending message that can be supplied to the director when the director requests pending messages. Thus, remanding a message in effect creates a time-out operation, where upon expiration of the time-out a message is transmitted to the director to remind the director that an asynchronous job was launched and may not have completed. A reason for the job not completing is that the job encountered a failure, or is otherwise unable to complete the task.

At step 360, the transaction begun at step 305 is committed.

Alert Cancellation

If the type of alert message obtained at step 310 is an alert cancellation message, then at step 350, the director requests that the local messaging component dequeue the service-level alert message for the corresponding service-level alert. Then at step 360, the transaction begun at step 305 is committed.

Asynchronous Job Result

When an asynchronous job completes an attempt to perform a remedial action, it transmits an alert message to the director via the local messaging component. The alert message specifies the job identification and the result of the remedial action, specifying, for example, whether or not the remedial action was completed successfully, and other information about the completion of the remedial action, such as how many sessions were migrated between database instances by incremental run-time session balancing.

If the type of alert message obtained at step 310 is an asynchronous job result, then the director gets the job identification and results from the alert message. At step 340, the director then requests that the local messaging component dequeue the alert message tagged with the job identification, thereby preventing later transmission of the alert message to the director.

At step 345, the director continues to process the alert as needed. In some cases the asynchronous job is a remedial action undertaken by a database director, such as run-time incremental session balancing or service expansion. There may be a delay between when these measures are completed and when the effects of the action become palpable or otherwise determinable by a workload monitor. The director remands a service-level alert message with a future due date so that the message time-outs after the period of time needed to determine the effect of the remedial action. If the service-level violation has been eliminated, then the corresponding service-level alert has been cancelled and the remanded service-level alert message dequeued from the directors' message queue.

Tagged Alert Message Times-Out

If the alert message obtained at step 310 is tagged with the identification of an asynchronous job, then the corresponding asynchronous job has not completed within the time expected. The job may have failed, or encountered conditions that are stalling completion of the job. At step 330, the director stops the asynchronous job from running, and continues on to step 320. At step 320, the director determines what remedial action to take to resolve the service-level alert. The remedial action may be the same or a different type of action as was undertaken by the asynchronous job just shut down.

The number of attempts a particular type of remedial action is undertaken for a particular service-level alert is tracked by updating a counter and storing it in a remanded alert message.

A director may limit the number of attempts a certain type of remedial action is undertaken. After the number of attempts is exceeded, the director chooses a different course of action.

Handling of Auto-Commit Operations

There are some operations performed by a director within a transactional loop that are auto-committing. Auto-committing operations are operations that are automatically committed when performed. Examples of auto-committing operations include the execution of database definition language commands ("DDL") for defining database objects, such as tables and views. In an embodiment, a database director creates database links to other databases. The creation of a database link is an auto-commit transaction. Database links are used to define a communications path between databases. A database link defines a network connection to a "remote database", a name to associate with the remote database, and, optionally, a username, to use in connecting to a remote database.

As demonstrated previously, it is important that the batch of operations executed in an iteration of a transactional loop, such as the dequeueing of an alert message from the directors' queue, other messaging actions and other changes made to database state, be committed or otherwise terminated as a single transaction, to leave the state of the directors' message queue as well as other database state in a state consistent with the alert message having been completely processed or not having been processed at all. If an auto-commit operation is executed during an iteration of a transactional loop, then the auto-commit operation and other operations performed after the transaction was begun but before the auto-commit operation was executed are committed as one transaction. Operations performed after execution of the auto-commit operation are in another separate transaction, which may be committed or rolled back. As a result, the state of the directors' message queue as well as other database state may not be consistent with the alert message having been completely processed or not having been processed at all. To prevent this type of error, auto-commit transactions can be executed as autonomous transactions.

An autonomous transaction is a transaction that may be commenced and committed (or otherwise terminated) during execution of another transaction without terminating the other transaction. When execution of an autonomous transaction begins, the other transaction may be suspended. The other transaction is referred to as the containing transaction. When an autonomous transaction is terminated, execution of the containing transaction is resumed.

Director Rejuvenation

In an embodiment, a director automatically ceases to run after a period of time, causing the standby director to take over. The database instance on which the director was running starts another director, which assumes the position of a standby director. This prevents a director from encountering errors that culminate over a period of time before becoming fatal to the director's process. Examples of such errors are memory space leaks.

Other Embodiments

An embodiment of the present invention has been illustrated using message driven directors responsible for dynamically allocating the resources of a multi-node system among database services and subcategories of database services. However, the present invention is not so limited. The present invention may be used for the recovery of any message-driven process or system that is able to process messages and other actions as a transaction. Nor is the present invention limited to use of the transactions performed by relational database systems and the like.

Hardware Overview

Figure 4:
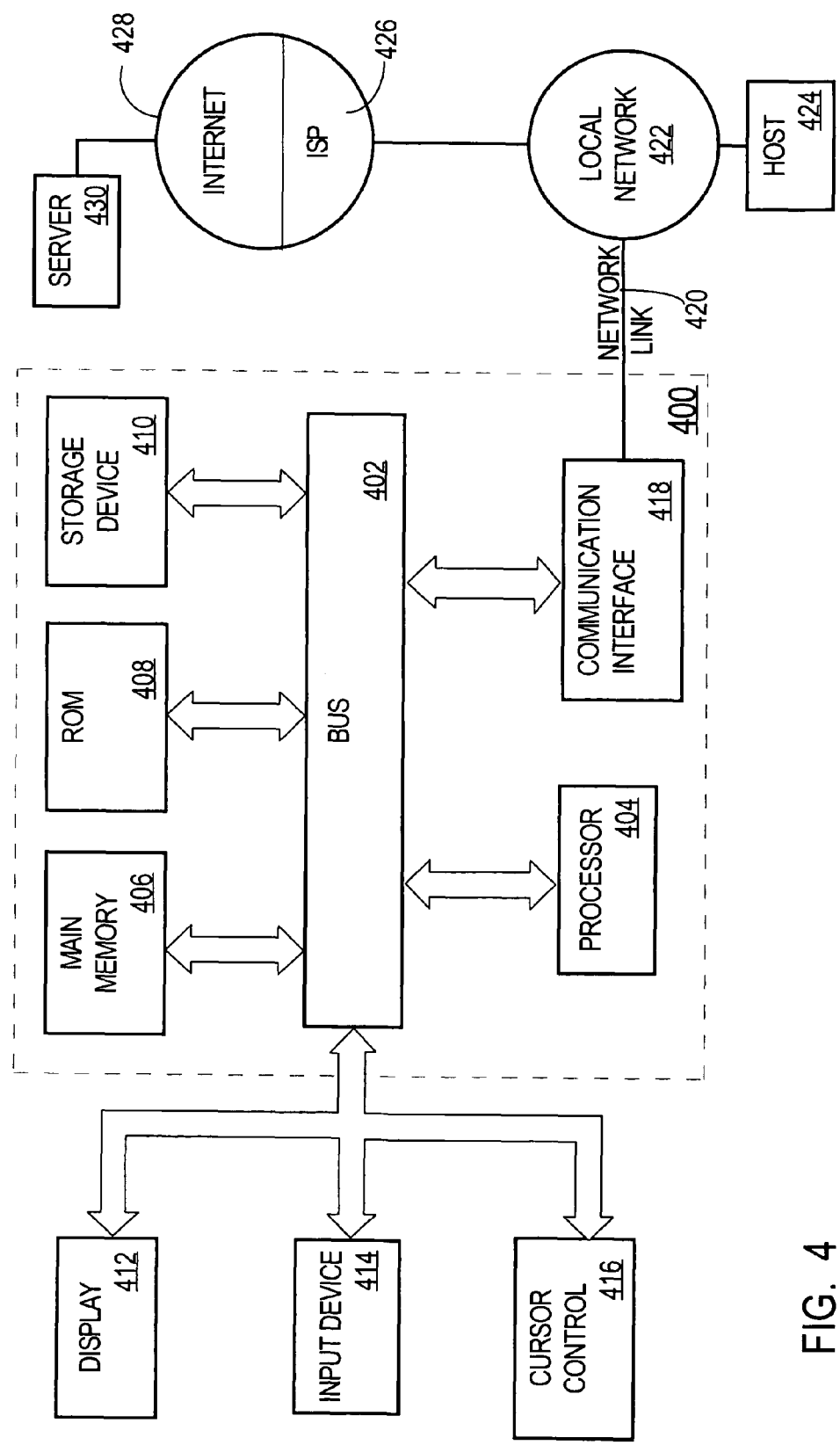
FIG. 4 is a block diagram of a computer system that may be used in an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for performing actions in response to messages transmitted within a computer system, the method comprising steps of:
receiving within a queue a first message that notifies of a condition;
as a first transaction initiated by a first entity, performing first operations that include:
dequeueing the first message from the queue, and
performing a first operation related to the condition;
wherein said first transaction terminates without being committed;
as a second transaction initiated by a second entity, performing second operations that include:
dequeueing the first message from the queue, and
performing a second operation related to the condition;
committing said second transaction; and
wherein the steps are performed by one or more computing machines.

2. The method of claim 1, wherein:
the first message notifies of a violation of service-level agreements associated with the computer system; and
the first operation attempts to adjust allocation of resources within the computer system to remedy the violation.

3. The method of claim 2, wherein the first operations include requesting that a second message be transmitted.

4. The method of claim 3, wherein:
the first operations include requesting that a third message be transmitted to a third entity, said third message requesting an action related to the condition; and
the second operations include requesting a fourth message to be transmitted to said third entity, said fourth message requesting said action related to the condition.

5. The method of claim 3, wherein the first operations include causing a third message for a recipient to be added to the queue in a way that causes the third message to be received by the recipient after a specified period of time, wherein said third message notifies of said condition.

6. The method of claim 5, after said specified period of time:
as a third transaction, performing third operations that include:
dequeueing the third message from the queue, and
performing a third operation related to the condition.

7. The method of claim 5, the steps further including:
receiving within the queue a fourth message that notifies that said condition has abated;
supplying said fourth message to said first entity; and
wherein supplying said fourth message to said first entity causes dequeueing of said third message.

8. The method of claim 2, wherein:
said first entity includes a first process executing on a node of said computer system; and
the first operations include initiating an asynchronous process executing on said computer system to perform said first operation.

9. The method of claim 8, wherein the first operations include causing a third message for a recipient to be added to the queue in a way that causes the third message to be received by the recipient after a specified period of time, wherein said third message identifies said asynchronous process.

10. The method of claim 9, the steps further including:
receiving said third message;
determining that said third message identifies said asynchronous process; and
in response to determining that said third message identifies said asynchronous process, ceasing execution of said asynchronous process.

11. The method of claim 9, the steps further including:
receiving a fourth message that includes data that:
indicates a result of the first operation performed by said asynchronous process performing the action, and
identifies said asynchronous process; and
in response to receiving the fourth message, dequeueing the third message.

12. The method of claim 1, wherein:
the computer system includes a first node and a second node;
the first entity is hosted by said first node;
the second entity is hosted by said second node; and
the second entity serves as standby to perform a responsibility of said first entity in response to ceasing execution of said first entity.

13. The method of claim 12, the steps further including:
detecting expiration of a period of time; and
in response to detecting the expiration of the period of time, ceasing execution of said first entity.

14. A non-transitory computer-readable medium storing instructions encoded therewith which, when executed with one or more processors of a computer system, causes performance of steps of:
as a first transaction initiated by a first entity, performing first operations that include:
dequeueing the first message from the queue, and
performing a first operation related to the condition;
wherein said first transaction terminates without being committed;
as a second transaction initiated by a second entity, performing second operations that include:
dequeueing the first message from the queue, and
performing a second operation related to the condition; and
committing said second transaction.

15. The non-transitory computer-readable medium of claim 14, wherein:
the first message notifies of a violation of service-level agreements associated with the computer system; and
the first operation attempts to adjust allocation of resources within the computer system to remedy the violation.

16. The non-transitory computer-readable medium of claim 15, wherein the first operations include requesting that a second message be transmitted.

17. The non-transitory computer-readable medium of claim 16, wherein:
the first operations include requesting that a third message be transmitted to a third entity, said third message requesting an action related to the condition; and
the second operations include requesting a fourth message to be transmitted to said third entity, said fourth message requesting said action related to the condition.

18. The non-transitory computer-readable medium of claim 16, wherein the first operations include causing a third message for a recipient to be added to the queue in a way that causes the third message to be received by the recipient after a specified period of time, wherein said third message notifies of said condition.

19. The non-transitory computer-readable medium of claim 18, after said specified period of time:
as a third transaction, performing third operations that include:
dequeueing the third message from the queue, and
performing a third operation related to the condition.

20. The non-transitory computer-readable medium of claim 18, the steps further including:
receiving within the queue a fourth message that notifies that said condition has abated;
supplying said fourth message to said first entity; and
wherein supplying said fourth message to said first entity causes dequeueing of said third message.

21. The non-transitory computer-readable medium of claim 15, wherein:
said first entity includes a first process executing on a node of said computer system; and
the first operations include initiating an asynchronous process executing on said computer system to perform said first operation.

22. The non-transitory computer-readable medium of claim 21, wherein the first operations include causing a third message for a recipient to be added to the queue in a way that causes the third message to be received by the recipient after a specified period of time, wherein said third message identifies said asynchronous process.

23. The non-transitory computer-readable medium of claim 22, the steps further including:
receiving said third message;
determining that said third message identifies said asynchronous process; and
in response to determining that said third message identifies said asynchronous process, ceasing execution of said asynchronous process.

24. The non-transitory computer-readable medium of claim 22, the steps further including:
receiving a fourth message that includes data that:
indicates a result of the first operation performed by said asynchronous process performing the action, and
identifies said asynchronous process; and
in response to receiving the fourth message, dequeueing the third message.

25. The non-transitory computer-readable medium of claim 14, wherein:
the computer system includes a first node and a second node;
the first entity is hosted by said first node;
the second entity is hosted by said second node; and
the second entity serves as standby to perform a responsibility of said first entity in response to ceasing execution of said first entity.

26. The non-transitory computer-readable medium of claim 25, the steps further including:
detecting expiration of a period of time; and in response to detecting the expiration of the period of time, ceasing execution of said first entity.

* * * * *

UNITED STATES PATENT AND TRADEMARK OFFICE
CERTIFICATE OF CORRECTION

| | |
|---|---|
| PATENT NO. | : 8,365,193 B2 |
| APPLICATION NO. | : 10/918054 |
| DATED | : January 29, 2013 |
| INVENTOR(S) | : Chidambaran et al. |

It is certified that error appears in the above-identified patent and that said Letters Patent is hereby corrected as shown below:

On the Title Page, References Cited

On page 3, in column 1, under "Other Publications", line 12, delete "XP0106032563," and insert -- XP010632563, --, therefor.

On page 3, in column 1, under "Other Publications", line 18, delete "Search" and insert -- Searching --, therefor.

On page 3, in column 2, under "Other Publications", line 3, delete "Search" and insert -- Searching --, therefor.

In the Specification

In column 1, line 25, delete "et al," and insert -- et al. --, therefor.

In column 1, line 28, delete "et al," and insert -- et al. --, therefor.

In column 1, line 33, delete "et al," and insert -- et al. --, therefor.

In column 1, line 37, delete "et al," and insert -- et al. --, therefor.

In column 1, line 41-42, delete "et al," and insert -- et al. --, therefor.

In column 1, line 46, delete "et al," and insert -- et al. --, therefor.

In column 1, line 49, delete "et al," and insert -- et al. --, therefor.

In column 9, line 59, delete "quiese" and insert -- quiesce --, therefor.

Signed and Sealed this
Twenty-fifth Day of August, 2015

Michelle K. Lee
*Director of the United States Patent and Trademark Office*

CERTIFICATE OF CORRECTION (continued)
U.S. Pat. No. 8,365,193 B2

In column 10, line 40, delete "quiese" and insert -- quiesce --, therefor.

In column 12, line 6, delete "data/time" and insert -- date/time --, therefor.

In the Claims

In column 18, line 6, in Claim 19, after "claim 18," insert -- the steps further including, --.